United States Patent [19]
Kaspar et al.

[11] Patent Number: 5,631,638
[45] Date of Patent: May 20, 1997

[54] INFORMATION SYSTEM IN A MOTOR VEHICLE

[75] Inventors: Rudolf Kaspar, Collenberg; Peter Fuerst, Buergstadt, both of Germany

[73] Assignee: Hohe GmbH & Co.KG., Collenberg, Germany

[21] Appl. No.: 271,892

[22] Filed: Jul. 8, 1994

[30] Foreign Application Priority Data

Jul. 9, 1993 [DE] Germany .......................... 43 22 937.9

[51] Int. Cl.⁶ .................................................. G08G 1/00
[52] U.S. Cl. .................... 340/902; 340/905; 340/438; 359/603; 359/602; 359/608; 359/609; 359/630
[58] Field of Search ............................ 340/475, 905, 340/438, 463, 815.06, 815.07; 359/836, 630, 634, 602, 603, 604, 605, 608, 609; 362/83.1

[56] References Cited

U.S. PATENT DOCUMENTS

| | | | |
|---|---|---|---|
| 4,499,451 | 2/1985 | Suzuki et al. | 362/83.1 |
| 4,625,210 | 11/1986 | Sagl . | |
| 4,630,904 | 12/1986 | Pastore | 359/604 |
| 4,701,022 | 10/1987 | Jacob | 359/604 |
| 4,793,690 | 12/1988 | Gahan et al. | 350/279 |
| 5,223,814 | 6/1993 | Suman | 340/525 |
| 5,253,109 | 10/1993 | O'Farrell et al. | 359/604 |
| 5,285,060 | 2/1994 | Larson et al. . | |

FOREIGN PATENT DOCUMENTS

| | | |
|---|---|---|
| 0254435 | 1/1988 | European Pat. Off. . |
| 1571768 | 6/1969 | France . |
| 2332885 | 1/1975 | Germany . |
| 7625590 | 8/1976 | Germany . |
| 7708610 | 9/1977 | Germany . |
| 3423636 | 1/1986 | Germany . |
| 8615559.8 | 11/1986 | Germany . |
| 3720848 | 1/1989 | Germany . |
| 9105202.5 | 9/1991 | Germany . |
| 61-75033 | of 1986 | Japan . |
| WO82/024487 | 7/1982 | WIPO . |

OTHER PUBLICATIONS

Patent Abstracts of Japan, vol. 10, No. 246 (M–510) (2302) Aug. 23, 1986.
JP–A–61 075 033 (Seiko Epson Corp.) Apr. 17, 1986.
Patent Abstracts of Japan, vol. 5, No. 166 (M–93) (838) Oct. 23, 1981.
JP–A–56 090 743 (Daini Seikosha K.K.).
Patent Abstracts of Japan, M–510, Aug. 23, 1986 vol. 10/No. 246.

*Primary Examiner*—Jeffery Hofsass
*Assistant Examiner*—Daryl C. Pope
*Attorney, Agent, or Firm*—Jacobson, Price, Holman & Stern, PLLC

[57] ABSTRACT

An information system in a motor vehicle which includes electronic circuits connectable to the vehicle computer of the motor vehicle as well as one or more sensors, a display device and possibly operational elements. In order that the display device be clearly laid out for the driver, it is designed so that the sensor and the circuits are accommodated in the frame of a motor vehicle rear-view mirror, with the circuits being linked to a cable connectable to the on-board computer and led through a hollow arm of the rear-view mirror, with the display system being integrated in the mirror glass of the rear-view mirror.

3 Claims, 4 Drawing Sheets

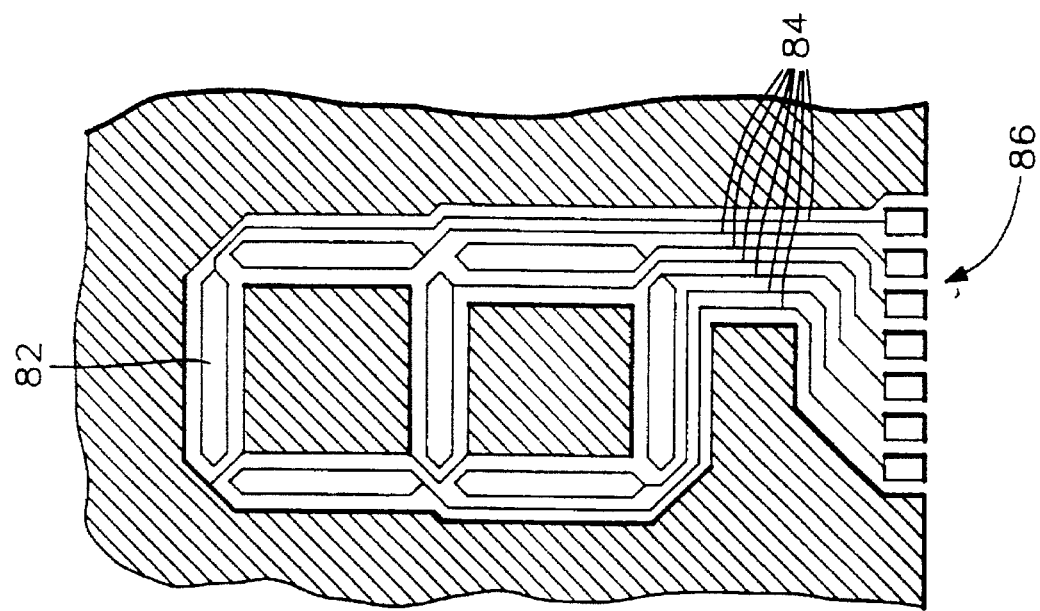
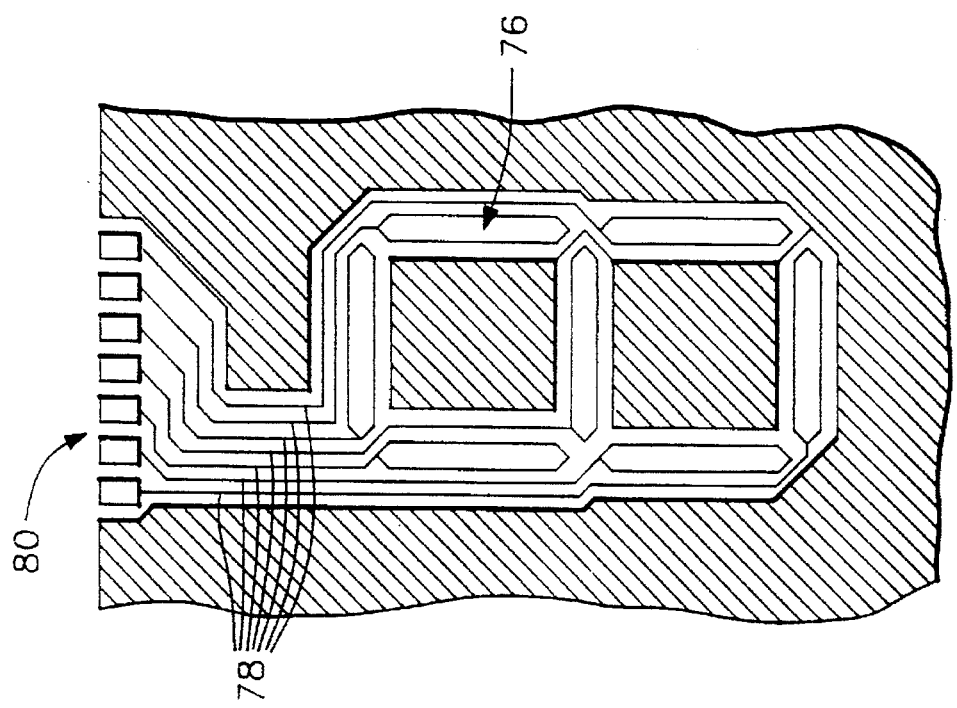

INFORMATION SYSTEM IN A MOTOR VEHICLE

FIELD OF THE INVENTION

The invention deals with an information system in a motor vehicle which includes electronic circuits connectable to the on-board network of the motor vehicle as well as one or more sensors, a display device and possibly operational elements.

BACKGROUND OF THE INVENTION

It generally presents a problem to provide the driver of a motor vehicle with information concerning the operational status of the vehicle as well as conditions existing outside and inside the vehicle without jeopardizing safe driving due to excessive distraction of the driver's attention. The installation of corresponding displays and operational knobs on the instrument panel or instrument console contributes to the confusion of the driver on account of lacking clarity as a result of the extent of the displays and draws his view relatively far away from roadway activity.

SUMMARY OF THE INVENTION

The invention is thus based on the task of creating an information system whose display devices are clearly laid out for the driver and located as near as possible to his field of vision directed towards roadway activity.

In accordance with the invention, this task is accomplished in that the sensor and the circuits of the information system initially mentioned are housed in the frame of the motor vehicle rear-view mirror, with the circuits being linked to a cable connectable to the on-board network and led through a hollow arm of the rear-view mirror, with the display system being integrated in the mirror glass of the rear-view mirror. The rear-view mirror lies approximately at the driver's eye level and slightly to the side of the field of vision, so that he can view the display system with his eyes without moving his head. In this manner the invention fosters safe driving. Furthermore, use is made of the available space within the mirror frame, especially with large rear-view mirrors, so that no additional space is required for the information system in the vehicle itself. To the extent operating elements are useful for the information system, these can be provided in an attachment installed lengthwise on the under edge of the rear-view mirror. This attachment can also have an additional display field for less important driver information.

A rear-view mirror is in fact known from the German Publication Notification 32 34 157 in which an electric motor as well as electronic circuits necessary for its control is accommodated in the unused space between the mirror glass and the rear portion of the mirror frame. A light-sensitive sensor is located in a strip mounted under the mirror frame, whose output signals are fed over electric circuits of the electronic circuits. These measures enable however only a photoelectrically controlled folding down of the mirror glass when the driver is blinded by the vehicle behind him, and thus only a measure which deals with the intended function of the rear-view mirror itself.

In accordance with the German Registered Designs Notification 91 04 319, the frame of a vehicle rear-view mirror serves the purpose of reception of an electronic circuits electronically transmitted from an infra-red receiver, in order to enable the locking and unlocking of vehicle doors through remote control by means of an infra-red transmitter. There is, however, no room here for driver information.

In this respect, the invention makes use of the rear-view mirror for carrying out various tasks in the management of the vehicle, whose significant part is comprised of driver information. Thus, the rear-view mirror becomes a carrier of status displays and subsidiary operational data of the vehicle in its predominant position relatively close to the driver's eyes.

BRIEF DESCRIPTION OF THE DRAWINGS

The invention is described below in detail with use of examples in the attached drawings. These show:

FIG. 4 and 5 schematic depiction of the control of the display segments in the mirror glass of the rear-view mirror.

DETAILED DESCRIPTION OF THE PREFERRED EMBODIMENTS

Figure 1:
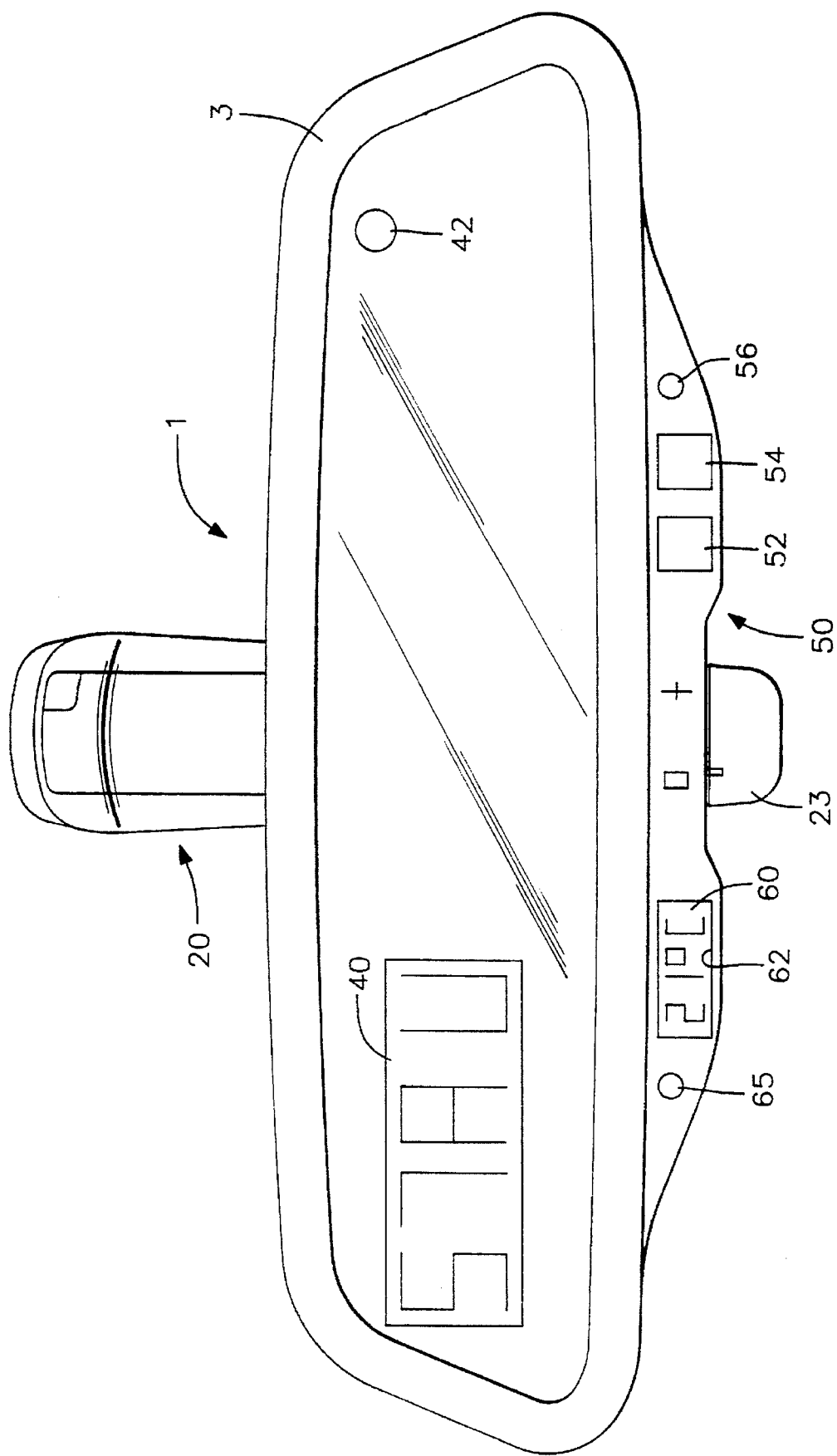
FIG. 1 a view of a vehicle rear-view mirror with the features of the invention.
Figure 2:
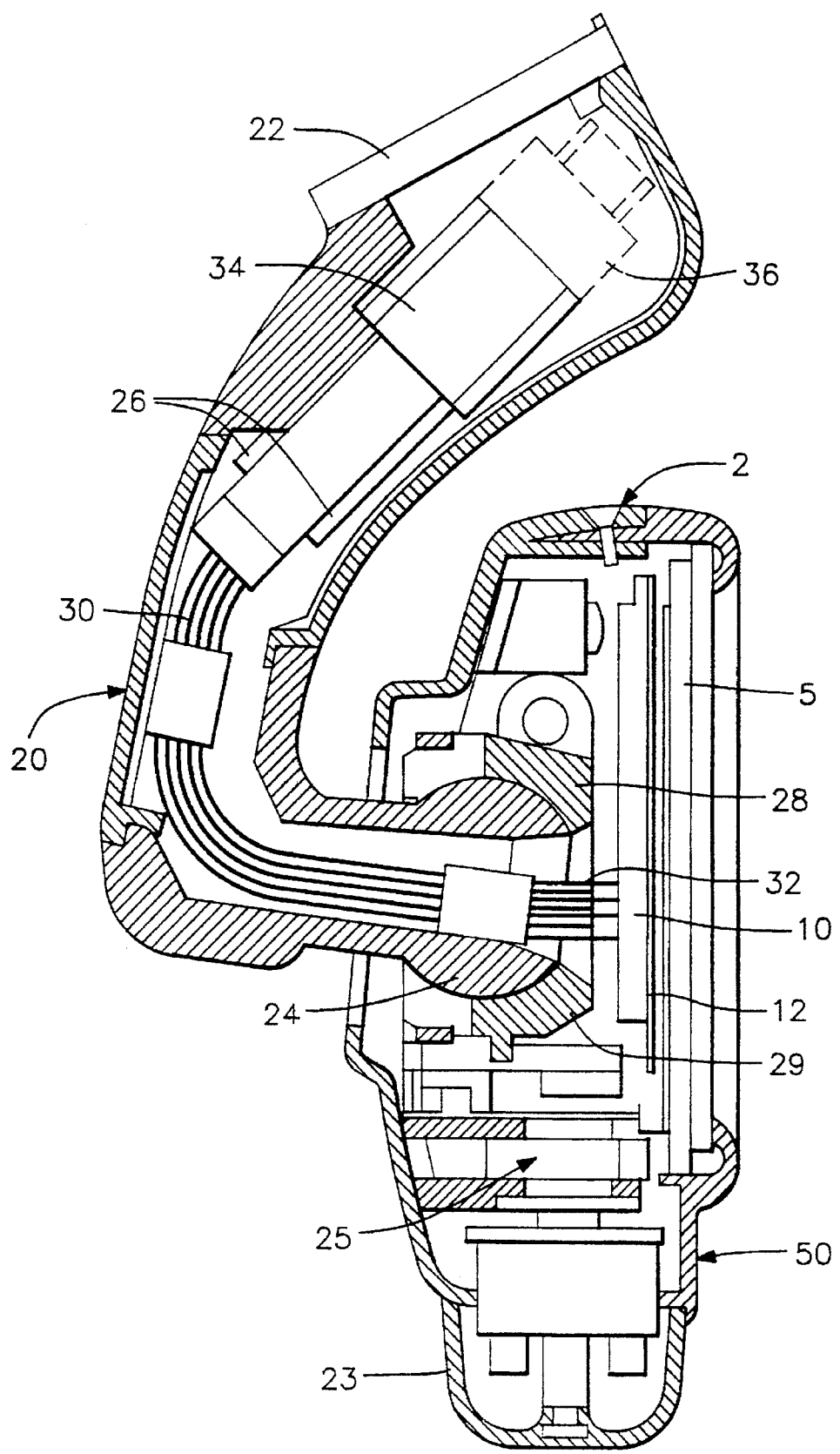
FIG. 2 a vertical view through a hollow arm and through the mirror frame of the rear-view mirror as set out by FIG. 1.

The rear-view mirror 1, which is especially suitable for automobiles or public transport vehicles, possesses an L-shaped arm 20, whose upper relatively flat end is equipped with the mirror-side part of a fastening device 22 as set out by German Publication Notification 29 47 512 for instance, and whose bottom end 24 is ball-formed. An electric cable 30 consisting of numerous wires extends through the hollow arm 20, whose mirror-side end 32 is connected to an electric circuits 10. The cable 30 is led into a socket 34 near the fastening device 22, whose shaft is held by a clamp 26 fastened to the arm 20. A plug 36 can be inserted into the socket 34, which is linked with a cable of the vehicle on-board network (not depicted) extending through the device 22.

On the ball end 24 of the arm 20, a mirror frame 2 is clamped on adjustably by hand by means of caps 28, 29 in the known manner. The part bordering the ball end 24 of the arm 20 extends through a rear opening of the frame 2, so that the ball end 24 is located within the mirror frame 2. An adjusting mechanism is housed under the caps 28, 29 indicated together with 25, which is carried out as set out by German Registered Designs Notification 91 01 986 for instance and having a control member 23 in the form of a knob protruding out of the mirror frame downwards. The mirror frame 2 holds a mirror glass 5, which can be observed through a front opening of the mirror frame 2 in the known manner. The mirror glass has two equally large glass tops, between which an electrochrome substance is contained. An electronic control 70 is provided in the electric circuits 10, which carries voltage corresponding to the light conditions under the control of a central processor 74 over a wire pair 72 to the electrochrome substance in order to make the mirror glass reflect strongly or weakly for the light with which it comes into contact. The central processor 74 is also a component of the electric circuits 10.

Figure 3:
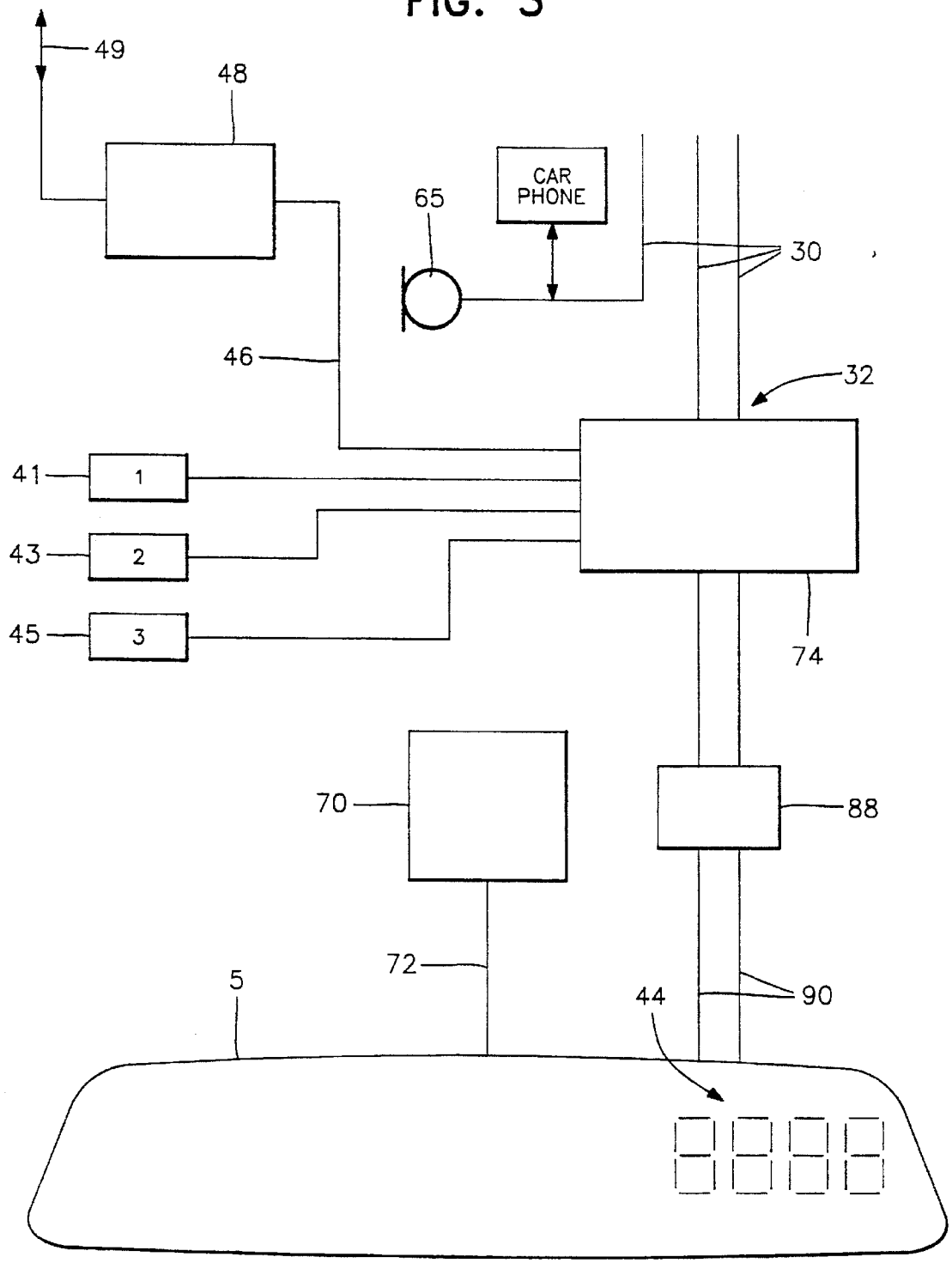
FIG. 3 an electric block diagram of the information system in the rear-view mirror.

In the electrochrome substance, composable numbers and letters are individually made up of 7 segments each, which are presented schematically in FIG. 3 as 8888. The front seven segment electrodes 76 for a number or letter are linked individually or separately via separate electric conductor paths 78 to seven junctions 80 on the edge of the mirror glass 5. The seven rear segment electrodes 82 for the display are linked via separate conductor paths 84 to a contact point 86, which are led out from the under side of the mirror glass. A segment driver controlled by a central processor 74 is linked via output lines 90 to the contact points 80 and 86 in order to have the desired number or letter series appear in the mirror glass 5 through their contact. The total number of the selected letters or numbers in the current example 4 form a display field 44, which is integrated into the mirror glass 5 and enables a desired display (for instance, STAU [traffic jam]) or temperatures or other numeric data under control of the central computer independent from the adjusted reflection capacity of the mirror glass 5 with electrochrome substance.

The central processor 74 additionally receives input signals parallel for numerous sensors 41, 42, 43 as well as over a line 46 from a reception unit 48, which can be a signal amplifier and signal processing unit for electric signals received from an antenna 49. The antenna 49 is a ultra short-wave receiver antenna, which is put up behind the circuits 10 over the breadth of the frame 2 as a wire and is linked with the circuits 10. The central processor 74 is finally linked with the end 32 of the cable 30. The electrochrome material also has a smaller round part 42 behind which a light-sensitive element is held as sensor 41 which is not depicted. The sensor 41 is linked with the processor 74 of the circuits 10. The part 42 can be provided for the sensor 41 in a right upper corner of the mirror glass. The circuit board 12 which holds the circuits 10 is held behind the mirror glass 5 and parallel to it in the mirror frame 2 in a way not depicted.

A strip 50 is formed lengthwise on the mirror frame 2 along the under edge out of which the knob projects which is formed as set out by German Design Registration Notification 91 04 319 for instance. The strip 50 has a section 62 on its front side, which is located somewhat beneath the display device and behind which an additional display device 60 is held in the form of a liquid crystal cell. The liquid crystal cell 60 is linked electrically with the circuits 10. The strip 50 also has additional sections in which operational devices, here two activation buttons 52, 54, are fastened, which themselves are electrically linked with circuits 10. The operational buttons 52, 54 are effectively located within reach of the knob 23 on the front side of the strip 50. Finally, the strip 50 has an additional small round opening for an additional sensor 43. The sensor 43 is also electrically linked with the circuits 10.

It is within the framework of the invention to provide for additional control members and/or sensors 45 on the strip 50. It is also possible to accommodate one or more sensors in the edge 3 of the mirror frame 2. Additionally, a buzzer can also be incorporated in the mirror frame 2 itself or in the strip 50 as an electro-acoustic signal generator.

The above system can be used for the following tasks.

1. Data reception of accidents:

An additional increase in accident safety is presented by the reception of warning signals over ultra short-wave reception antennas 49 in the rear-view mirror from a vehicle involved in an accident. The vehicle approaching the vehicle involved in the accident is timely warned with automatic triggering of the reception unit 48 integrated in the circuits 10.

2. Data reception:

Within the framework of traffic control systems, driver information (for example, traffic jam warnings) are transmitted from transmitters located on the roadway. This information is received by the circuits 10 over the reception antenna 49 and displayed in the display system 40 or 44 as STAU [TRAFFIC JAM] for the driver. Unfavorable weather conditions can also be brought to the driver's attention in the named manner over the display units 40 or 44.

An infra-red receiver as set out by German Design Registration Notification 91 04 319 for instance or an ultra short-wave receiver can be provided for according to the transmission medium used by the transmitters located along the roadway.

3. A microphone 65 can be built in to the rear-view mirror on the strip 50 for instance, which recognizes the human voice of the driver and can trigger vehicle functions over the cable 30 and the on-board computer. The microphone can also serve as a free-hand system for an existing car phone, for instance.

4. The display unit 40 can consist of EC segments or LC segments which are integrated in an electrochrome mirror glass 5 as described. Alternatively, LC segments can be integrated in a mirror glass 5 formed as a wedge glass. A background light can also be provided for night driving.

5. The sensors 41, 43 and 45 can record the inside temperature in the vehicle, the humidity in the vehicle, the air pressure, the pollution content within the vehicle as well as the light intensity outside the vehicle, in order to automatically activate the headlights in the latter case. Since the circuits 10 is directly linked electrically via the cable 30 with the on-board computer and thus directly linked electrically to the vehicle computer, necessary information can be directly communicated over the display device 40 or 44.

We claim:

1. A rear-view mirror information display system for a motor vehicle having an on-board network for providing information as to various motor vehicle functions, the display system comprising a rear view mirror having a housing, a hollow arm connected with the housing for receiving an electrical cable connectable to the on-board network, a mirror glass having a reflectivity, said mirror glass mounted to the housing, said mirror glass comprising a pair of glass plates having an electrically sensitive substance therebetween for adjusting the reflectivity of the mirror glass, a light emitting display unit having multiple display segments, said light emitting display unit embedded within the mirror glass, each of said display segments being separately controlled by a segment driver to form a plurality of numbers and letters that are visually observable by a vehicle occupant, electrical circuit means mounted within said housing and connected with the electrical cable for receiving information from the on-board network, said electrical circuit means including central processing means, said segment driver, and mirror glass reflection control means for providing voltage to the electrically sensitive substance, said central processing means receiving information from the on-board network and controlling said segment driver to actuate said display segments to display information derived form the on-board network, said central processing means further controlling the mirror glass reflection control means to adjust the voltage applied to the electrically sensitive substance within the mirror glass, and further comprising a microphone within said rear-view mirror, said microphone connected to the onboard network of the vehicle.

2. A rear-view information display system for a motor vehicle having an on-board network for providing information as to various motor vehicle functions, the display system comprising a rear view mirror having a housing, a hollow arm connected with the housing for receiving an electrical cable connectable to the on-board network, a mirror glass having a reflectivity, said mirror glass mounted to the housing, said mirror glass comprising a pair of glass plates having an electrically sensitive substance therebetween for adjusting the reflectivity of the mirror glass, a light emitting display unit having multiple display segments, said light emitting display unit embedded within the mirror glass, each of said display segments being separately controlled by a segment driver to form a plurality of numbers and letters that are visually observable by a vehicle occupant, electrical circuit means mounted within said housing and connected with the electrical cable for receiving information from the on-board network, said electrical circuit means including central processing means, said segment driver, and mirror glass reflection control means for providing voltage to the electrically sensitive substance, said central processing means receiving information from the on-board network and controlling said segment driver to actuate said display segments to display information derived form the on-board network, said central processing means further controlling the mirror glass reflection control means to adjust the voltage applied to the electrically sensitive substance within the mirror glass, and an ultra shortwave antenna in the form of a long electric conductor provided within said housing and linked electronically with said electrical circuit means.

3. A rear-view information display system for a motor vehicle having an on-board network for providing information as to various motor vehicle functions, the display system comprising a rear view mirror having a housing, a hollow arm connected with the housing for receiving an electrical cable connectable to the on-board network, a mirror glass having a reflectivity, said mirror glass mounted to the housing, said mirror glass comprising a pair of glass plates having an electrically sensitive substance therebetween for adjusting the reflectivity of the mirror glass, a light emitting display unit having multiple display segments, said light emitting display unit embedded within the mirror glass, each of said display segments being separately controlled by a segment driver to form a plurality of numbers and letters that are visually observable by a vehicle occupant, electrical circuit means mounted within said housing and connected with the electrical cable for receiving information from the on-board network, said electrical circuit means including central processing means, said segment driver, and mirror glass reflection control means for providing voltage to the electrically sensitive substance, said central processing means receiving information from the on-board network and controlling said segment driver to actuate said display segments to display information derived form the on-board network, said central processing means further controlling the mirror glass reflection control means to adjust the voltage applied to the electrically sensitive substance within the mirror glass, and further comprising a microphone within said rear-view mirror, said microphone serving as a free hand system for a car phone.

* * * * *